(12) United States Patent
Onoe et al.

(10) Patent No.: US 10,688,476 B2
(45) Date of Patent: Jun. 23, 2020

(54) EXHAUST GAS PURIFICATION CATALYST

(71) Applicant: CATALER CORPORATION, Shizuoka (JP)

(72) Inventors: Ryota Onoe, Shizuoka (JP); Shingo Sakagami, Shizuoka (JP); Tsuyoshi Ito, Shizuoka (JP); Yuta Morishita, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 15/509,976

(22) PCT Filed: Sep. 7, 2015

(86) PCT No.: PCT/JP2015/075374
§ 371 (c)(1),
(2) Date: Mar. 9, 2017

(87) PCT Pub. No.: WO2016/039302
PCT Pub. Date: Mar. 17, 2016

(65) Prior Publication Data
US 2017/0297005 A1    Oct. 19, 2017

(30) Foreign Application Priority Data
Sep. 10, 2014  (JP) .................................. 2014-184125

(51) Int. Cl.
*F01N 3/28* (2006.01)
*F01N 3/10* (2006.01)
(Continued)

(52) U.S. Cl.
CPC ............ *B01J 23/464* (2013.01); *B01D 53/94* (2013.01); *B01D 53/9454* (2013.01);
(Continued)

(58) Field of Classification Search
CPC ............. F01N 2330/60; F01N 2370/02; F01N 2510/06; F01N 2510/068;
(Continued)

(56) References Cited

U.S. PATENT DOCUMENTS 5,043,311 A * 8/1991 Engler ................. B01D 53/945
423/213.5
5,332,554 A 7/1994 Yasaki et al.
(Continued)

FOREIGN PATENT DOCUMENTS

CN 1346694 5/2002
CN 101395351 3/2009
(Continued)

OTHER PUBLICATIONS

Chinese Office Action—CN201580048739.2; dated Nov. 28, 2018.
(Continued)

*Primary Examiner* — Hung Q Nguyen
*Assistant Examiner* — Diem T Tran
(74) *Attorney, Agent, or Firm* — Occhiuti & Rohlicek LLP

(57) ABSTRACT

Provided is an exhaust gas purification catalyst in which the performance of a catalyst metal can be brought out properly, the purification catalyst boasting excellent purification performance during warm-up of an internal combustion engine. The exhaust gas purification catalyst 10 is provided with a substrate 1 and a catalyst layer. A leading end section 1*a* positioned upstream in the direction of exhaust gas flow (arrow) has a portion in which the flow rate of exhaust gas is relatively high and a portion in which the flow rate of exhaust gas is relatively low during warm-up of the internal combustion engine. The catalyst, layer in the portion of relatively high flow rate of exhaust gas has a high density section 6 in which a noble metal, is supported at relatively
(Continued)

high density. The high density section 6 is formed to be shorter than the total length of the exhaust gas purification catalyst 10 from the leading end section 1*a* in the direction of exhaust gas flow.

13 Claims, 9 Drawing Sheets

(51) Int. Cl.

| | |
|---|---|
| *B01J 23/46* | (2006.01) |
| *B01J 23/63* | (2006.01) |
| *B01D 53/94* | (2006.01) |
| *B01J 21/04* | (2006.01) |
| *B01J 23/10* | (2006.01) |
| *B01J 23/44* | (2006.01) |
| *B01J 35/00* | (2006.01) |
| *B01J 35/04* | (2006.01) |
| *B01J 37/02* | (2006.01) |
| *B01J 37/04* | (2006.01) |

(52) U.S. Cl.
CPC ............. *B01J 21/04* (2013.01); *B01J 23/10* (2013.01); *B01J 23/44* (2013.01); *B01J 23/63* (2013.01); *B01J 35/0006* (2013.01); *B01J 35/0073* (2013.01); *B01J 35/04* (2013.01); *B01J 37/0236* (2013.01); *B01J 37/0244* (2013.01); *B01J 37/04* (2013.01); *F01N 3/101* (2013.01); *F01N 3/28* (2013.01); *B01D 2255/1023* (2013.01); *B01D 2255/1025* (2013.01); *B01D 2255/2092* (2013.01); *B01D 2255/407* (2013.01); *B01D 2255/9022* (2013.01); *F01N 2330/60* (2013.01); *F01N 2370/02* (2013.01); *F01N 2510/06* (2013.01); *F01N 2510/068* (2013.01); *F01N 2510/0682* (2013.01); *F01N 2510/0684* (2013.01); *Y02T 10/22* (2013.01)

(58) Field of Classification Search
CPC ..... F01N 2510/0682; F01N 2510/0684; F01N 3/101; F01N 3/28; B01D 2255/1023; B01D 2255/1025; B01D 2255/2092; B01D 2255/407; B01D 2255/9022; B01D 53/94; B01D 53/9454; B01J 21/04; B01J 23/10; B01J 23/44; B01J 23/464; Y02T 10/22

See application file for complete search history.

(56) References Cited

U.S. PATENT DOCUMENTS

| | | | |
|---|---|---|---|
| 5,538,697 A * | 7/1996 | Abe | B01D 53/945 422/169 |
| 7,328,573 B2 | 2/2008 | Rigaudeau et al. | |
| 7,776,787 B2 | 8/2010 | Choi | |
| 2002/0042344 A1 | 4/2002 | Kondo et al. | |
| 2006/0144039 A1 | 7/2006 | Rigaudeau | |
| 2007/0049491 A1 | 3/2007 | Choi | |
| 2012/0288416 A1* | 11/2012 | Choi | F01N 3/2828 422/177 |
| 2013/0028819 A1* | 1/2013 | Plati | B01D 53/9454 423/212 |
| 2013/0150236 A1 | 6/2013 | Aoki | |
| 2013/0213000 A1* | 8/2013 | Segawa | B01D 53/9422 60/39.5 |

FOREIGN PATENT DOCUMENTS

| | | |
|---|---|---|
| CN | 103157516 | 6/2013 |
| DE | 40 42 079 | 7/1991 |
| DE | 102010053603 | 5/2012 |
| DE | 102011055924 A1 | 11/2012 |
| JP | 63-84635 | 4/1988 |
| JP | 4-011951 | 1/1992 |
| JP | 08-332350 | 12/1996 |
| JP | 2002-35585 | 2/2002 |
| JP | 2002-177794 | 6/2002 |
| JP | 2003-334444 | 11/2003 |
| JP | 2004-275883 | 10/2004 |
| JP | 2006-68679 | 3/2006 |
| JP | 2006-068679 * | 3/2006 |
| JP | 2009-285605 | 12/2009 |
| JP | 2010-131526 | 6/2010 |
| JP | 2013-154300 | 8/2013 |
| JP | 2013244438 * | 12/2013 |
| WO | WO 2007/099368 | 9/2007 |

OTHER PUBLICATIONS

Chinese Application No. 201580048739.2. Chinese Second Office Action dated Jul. 11, 2019 and English Translation, 21 pgs.
Office Action dated Nov. 22, 2019 issued in EP application No. 15840216.4.

* cited by examiner

EXHAUST GAS PURIFICATION CATALYST

CROSS REFERENCE TO RELATED APPLICATIONS

This application is a National Stage of International Application No. PCT/JP2015/075374 filed on Sep. 7, 2015, which claims priority to Japanese Application No. 2014-184125 filed on Sep. 10, 2014, the contents of which are hereby incorporated by reference in their entirety.

TECHNICAL FIELD

The present invention relates to an exhaust gas purification catalyst that is provided in the exhaust system of an internal combustion engine. More particularly, the present invention relates to an exhaust gas purification catalyst in which a catalyst metal is supported, at high density, in specific portions of a catalyst layer.

The present international patent application claims priority based on Japanese Patent Application No. 2014-184125, filed on Sep. 10, 2014, the entire contents whereof are incorporated in the present description by reference.

BACKGROUND ART

Harmful components such as hydrocarbons (HC), carbon monoxide (CO) and nitrogen oxides ($NO_x$) are present in exhaust gas that is emitted by internal combustion engines such as an automobile engine. Exhaust gas purification catalysts are conventionally used in order to remove efficiently such exhaust gas components. Exhaust gas purification catalysts adopt typically a form in which a noble racial functioning as a catalyst (hereafter also simply referred to as "catalyst metal") is supported on a porous earner. Typical examples of catalyst metals include for instance noble metals of the platinum group such as platinum (Pt), rhodium (Rh), and palladium (Pd). However, these noble metals are expensive and also valuable as resources. Accordingly, it is preferable to reduce the use amount of catalyst metal from the viewpoint of saving energy and lowering costs. For instance Patent Literature 1 is an example of a relevant technology in this regard. Patent Literature 1 discloses an exhaust gas purification catalyst provided with a substrate having a plurality of through-holes in the direction of exhaust gas flow, and with a catalyst layer containing a noble metal, formed on the inner wall surface of the through-holes, wherein the thickness of the catalyst layer is adjusted so that the fluid pressure of exhaust gas is uniform among all the through-holes.

CITATION LIST

Patent Literature

Patent Literature 1: Japanese Patent Application Publication No. 2010-131526
Patent Literature 2: Japanese Patent Application Publication No. S63-84635
Patent Literature 3: Japanese Patent Application Publication No. H8-332350

SUMMARY OF INVENTION

During warm-up of an internal combustion engine (for instance, upon startup of the engine in an idling state) the temperature of exhaust gas is low, and the exhaust gas contains a significant amount of HC and CO, which are unburned substances of fuel. During warm-up, moreover, the exhaust gas purification catalyst is not sufficiently heated, and the purification performance of the catalyst metal tends to be low (See Patent Literature 2 and 3). Green vehicles equipped with energy-saving mechanisms such as hybrid engines or a start-stop system, which allow the engine to stop also during operation, have become widespread in recent years concomitantly with an increased environmental consciousness and societal orientation towards energy conservation. Accordingly, it is particularly desirable to reduce the amount of catalyst metal that is used in an exhaust gas purification catalyst and at the same time to enhance purification performance thereof during warm-up of the internal combustion engine.

It is an object of the present invention, arrived at with a view to solving the above problems, to provide an exhaust gas purification catalyst in which the performance of a catalyst metal is brought out properly, and which boasts excellent exhaust gas purification performance during warm-up.

Studies by the inventors have revealed that the flow rate of exhaust gas is relatively low during warm-up of the internal combustion engine. As a result, exhaust gas tends to flow readily through specific portions in the exhaust gas purification catalyst. In other words, the exhaust gas purification catalyst has portions where the exhaust gas flow rate is relatively high and portions where the exhaust gas flow rate is relatively low, during warm-up of the internal combustion engine. When forming for instance the catalyst layer on a substrate by wash coating, however, the catalyst metal is supported substantially uniformly (homogeneously) in the through-holes of the exhaust gas purification catalyst. As a result, the catalyst metal was not effectively utilized, during warm-up of the internal combustion engine, in portions of low flow rate of exhaust gas and/or in portions of relatively low catalyst temperature.

The inventors conducted further diligent research on the basis of the above findings, and arrived at the present invention which allows solving the above problems. Specifically, the present invention provides an exhaust gas purification catalyst that is disposed in an exhaust passage connected to an internal combustion engine, e.g. an automobile engine, and that purifies exhaust gas emitted by the internal combustion engine. Such an exhaust gas purification catalyst is provided with a substrate and with a catalyst layer formed on the substrate, the catalyst layer containing a noble metal functioning as an oxidation and/or reduction catalyst and a carrier that supports the noble metal. When the exhaust gas purification catalyst is disposed in the exhaust passage, a leading end section (starting end) positioned upstream in the direction of exhaust gas flow has a portion in which the flow rate of exhaust gas is relatively high and a portion in which the flow rate of exhaust gas is relatively low during warm-up of the internal combustion engine. In the catalyst layer in the portion of relatively high flow rate of exhaust gas, there is provided a high density section in which the noble metal is supported at a higher density than in the catalyst layer in the portion of relatively low flow rate of exhaust gas. The high density section is formed to be shorter than the total length of the exhaust gas purification catalyst from the leading end section, in the direction of exhaust gas flow.

The catalyst metal can be utilized effectively by increasing the catalyst metal density in a portion of high exhaust gas flow rate during warm-up of the internal combustion engine.

Thus, in a case where the catalyst metal density in the high density section is similar to a conventional one, the use amount of the catalyst metal can be reduced while preserving a similar warm-up property (performance of raising the temperature of the exhaust gas purification catalyst). Alternatively, the warm-up property can be relatively improved in a case where the catalyst metal in an amount similar to a conventional one, is supported concentrated in the high density section. For instance, the temperature of the catalyst (typically, on the upstream side) can be raised quickly, centering on the high density section, from a state in which the exhaust gas purification catalyst is cold. The catalyst warm-up property is enhanced as a result, and exhaust gas can be discharged out in a cleaner state during warm-up of the internal combustion engine.

The term "leading end section" denotes the portion of substantially first contact with the exhaust gas, being the portion positioned furthest upstream in the exhaust passage (exhaust pipe) that has the exhaust gas purification catalyst disposed at a predetermined position thereof.

In a preferred aspect of the exhaust gas purification catalyst disclosed herein, the density of the noble metal in the high density section is 1.5 times or more the density of the noble metal in the portion of relatively low exhaust gas flow rate. As a result it becomes possible to bring out the effect of the present invention (i.e. reducing the use amount or enhancing the warm-up property of the catalyst metal) to a yet higher level.

In another preferred aspect of the exhaust gas purification catalyst disclosed herein, the catalyst layer has a layered structure of two or more layers, as viewed from the substrate, having mutually different configurations. The high density section is formed in an uppermost layer portion of the layered structure. By providing the high density section at the uppermost layer portion of the catalyst layer it becomes possible to secure more opportunities of contact with the exhaust gas (to expand the contact surface area), and to bring out more suitably the effect of the present invention.

In another preferred aspect of the exhaust gas purification catalyst disclosed herein, in the direction of exhaust gas flow, the high density section is formed to a length of 10% to 50% from the leading end section, with respect to 100% as the total length of the exhaust gas purification catalyst. The effect of the invention of the present application is elicited yet more stably as a result. Further, this allows suppressing migration of the catalyst metal from the high density section, and suppressing drops in catalytic activity caused by sintering and/or alloying.

In another preferred aspect of the exhaust gas purification catalyst disclosed herein, the high density section is formed over a surface area of 9% to 64% with respect to 100% as the total surface area of a cross-section perpendicular to the direction of exhaust gas flow. As a result it becomes possible to bring out the effect of the present invention (i.e. reducing the use amount or enhancing the warm-up property of the catalyst metal) to a yet higher level.

In another preferred aspect of the exhaust gas purification catalyst disclosed herein, the leading end section of the exhaust gas purification catalyst is a circle, and has the portion where the exhaust gas flow rate is relatively high, in an inner circumference part including the center of the circle, and the portion where the exhaust gas flow rate is relatively low in an outer peripheral portion adjacent to the inner circumference part. In the leading end section, preferably, the high density section is formed in the inner circumference part, the diameter of which is set to the inner diameter of the substrate, which is 30% to 80% of the outer diameter.

In another preferred aspect of the exhaust gas purification catalyst disclosed herein, the high density section is formed at a position spaced from the outer periphery of the cross-section of the exhaust gas purification catalyst, so as not to be in contact with the outer periphery. Beat escapes more readily at the outer peripheral portion of the exhaust gas purification catalyst, and the warm-up time tends to be relatively longer, than is the case in the inner portion. Accordingly, the warm-up property can be yet better enhanced if the high density section is positioned spaced from the outer periphery.

In another preferred aspect of the exhaust gas purification catalyst disclosed herein, a cross-section, of the exhaust gas purification catalyst, perpendicular to the direction of exhaust gas flow is formed as a circle. The cross-section of the high density section is formed as a circle the diameter of which is smaller than that of the circle of the exhaust gas purification catalyst.

In a case where the exhaust passage is straight the circle of the high density section may be disposed to be concentric with the circle of the exhaust gas purification catalyst.

Alternatively, the center of the circle of the high density section may be eccentric with respect to the center of the circle of the exhaust gas purification catalyst, in a case where the exhaust passage has a bent portion and/or an inclined portion.

DESCRIPTION OF EMBODIMENTS

Figure 1:
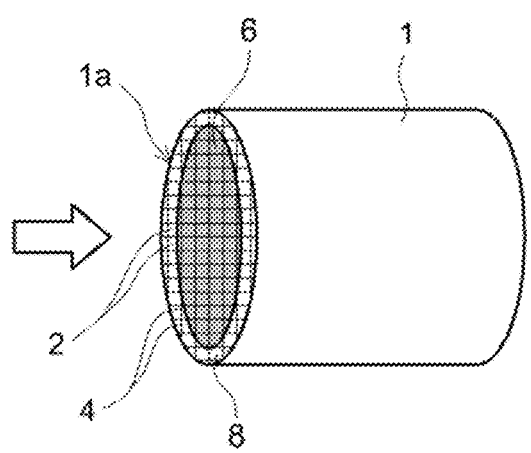
FIG. 1 is a perspective-view diagram illustrating schematically an exhaust gas purification catalyst according to an embodiment.

Preferred embodiments of the present invention will be explained below on the basis of drawings. In the drawings below, members and portions that elicit identical effects are denoted with identical reference numerals, and a recurrent explanation thereof will be omitted or simplified. The dimensional relationships (length, width, thickness and so forth) in the figures do not necessarily reflect actual dimensional relationships. Any features other than the features specifically set forth in the present description and which may be necessary for carrying out the present invention can be regarded as instances of design matter for a person skilled in the art on the basis of known techniques in the technical field in question. The invention can be realized on the basis of the disclosure of the present description and common technical knowledge in the relevant technical field.

Figure 9:
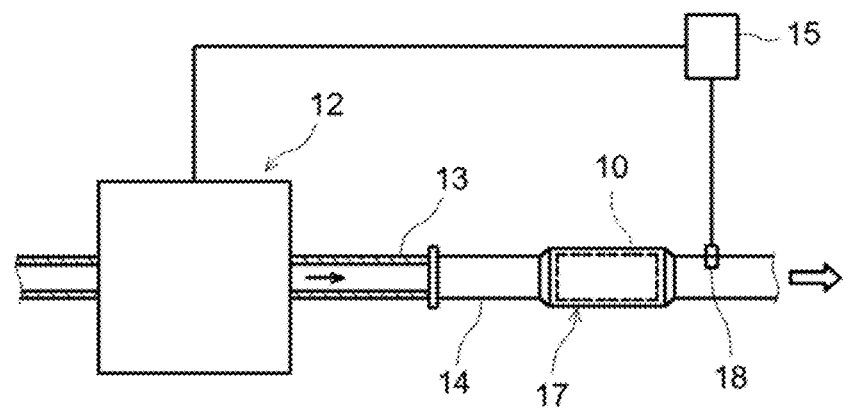
FIG. 9 is a diagram illustrating schematically an exhaust gas purification device according to an embodiment.

An exhaust gas purification device 17 provided with an exhaust gas purification catalyst 10 according to an embodiment of the present invention will be explained first. FIG. 9 is a diagram illustrating schematically an exhaust gas purification device 17 according to an embodiment. The exhaust gas purification device 17 is provided in the exhaust system of an internal combustion engine 12.

An air-fuel mixture containing oxygen and fuel gas is supplied to the internal combustion engine (engine) 12. In the internal combustion engine 12 the air-fuel mixture is burned, and the combustion energy is converted to mechanical energy. The burned air-fuel mixture becomes exhaust gas that is discharged to the exhaust system. The internal combustion engine 12 having the structure illustrated in FIG. 9 is configured mainly as a gasoline engine of an automobile. The exhaust gas purification device 17 is preferably installed for instance in the internal combustion engine 12 of a green vehicle in which the engine stops frequently during travel or during temporary vehicle stops. Examples of green vehicles include for instance passenger cars with a start-stop function (start-stop vehicles), and hybrid cars. Needless to say, the exhaust gas purification device 17 can be used also in engines other than gasoline engines (for instance, diesel engines).

One end of an exhaust manifold 13 is connected to an exhaust port (not shown) of the internal combustion engine 12, The other end of the exhaust manifold 13 is connected to an exhaust pipe 14. The arrows in the figure denote the flow direction of exhaust gas. An exhaust passage of exhaust gas is formed herein by the exhaust manifold 13 and the exhaust pipe 14.

The exhaust gas purification device 17 is provided with the exhaust passage (exhaust manifold 13 and exhaust pipe 14), an ECU 15, and the exhaust gas purification catalyst 10. The ECU 15 is an engine control unit that controls the internal combustion engine 12 and the exhaust gas purification device 17. The ECU 15 has, as a constituent element, an electronic device such as a digital computer, similarly to common control devices. The ECU 15 is provided with an input port (not shown). Typically, the ECU 15 is provided with sensors (for instance, a pressure sensor 18) that are disposed at respective locations in the internal combustion engine 12 and/or the exhaust gas purification device 17. Thereby, information detected at the respective sensors is transmitted via the input port to the ECU 15 in the form of electrical signals. The ECU 15 is also provided with an output port (not shown). The ECU 15 controls the operation of various portions of the internal combustion engine 12 and of the exhaust gas purification device 17 through transmission of control signals via the output port.

The exhaust gas purification catalyst 10 will be explained next. The exhaust gas purification catalyst 10 is disposed in the exhaust passage that communicates with the internal combustion engine 12. In FIG. 9, the exhaust gas purification catalyst 10 is provided downstream of the exhaust pipe 14. The exhaust gas purification catalyst 10 purifies exhaust gas discharged from the internal combustion engine 12.

FIG. 1 is a diagram illustrating schematically the exhaust gas purification catalyst 10 according to an embodiment. The direction of exhaust gas flow is depicted with an arrow in the figure. The left side of FIG. 1 corresponds to the upstream side of the exhaust passage (exhaust pipe 14), and the right side corresponds to the downstream side of the exhaust passage.

The exhaust gas purification catalyst 10 is provided with a substrate 1 and with a catalyst layer containing a catalyst metal and that is formed on the substrate 1. This exhaust gas purification catalyst 10 is characterized in that the arrangement of catalyst metal is optimized on the basis of the exhaust gas flow rate during warm-up of the internal combustion engine 12. Specifically, the exhaust gas purification catalyst 10 is characterized by having a high density section 6 in which a catalyst metal is supported, at high density, in a leading end section (leading end face) 1a. Therefore, other features are not particularly limited, and the exhaust gas purification catalyst 10 can be used in various internal combustion engines through appropriate selection of the substrate, carrier and catalyst metal described below, and through shaping to a desired shape in accordance with the intended use.

The substrate 1 constitutes the skeleton of the exhaust gas purification catalyst 10. A substrate conventionally used in this kind of applications can be appropriately utilized herein. The material of the substrate 1 may be heat-resistant. Examples of heat-resistant materials include for instance ceramics such as cordierite, aluminum titanate, silicon carbide (SiC) or the like, and alloys such as stainless steel. For instance a honeycomb shape, a foam shape, a pellet shape or the like can be adopted as the shape of the substrate. As an example, a honeycomb substrate 1 having a cylindrical outer shape is used in FIG. 1. The honeycomb substrate 1 is provided with a plurality of through-holes (cells) 2 arrayed regularly in the cylinder axis direction, and with a plurality of partition walls (rib walls) 4 that partition the cells 2. The cells 2 are flow channels of exhaust gas, and the partition walls 4 are configured in such a manner that exhaust gas can come into contact with the partition walls 4. Besides a cylindrical shape, the outer shape of the substrate 1 as a whole may be an elliptical cylinder shape, a polygonal cylinder shape or the like.

The capacity of the substrate 1 (total volume of the substrate 1, bulk volume) may be ordinarily 0.1 L or greater, preferably 0.5 L or greater, and for instance 5 L or smaller, preferably 3 L or smaller, and more preferably 2 L or smaller. The total length of the substrate 1 in the direction of exhaust gas flow may be ordinarily 10 to 500 mm, for instance about 50 to 300 mm.

A catalyst layer is formed, on the substrate 1. In FIG. 1, for instance, a catalyst layer of predetermined properties (for instance, length and thickness) is formed on the surface of the partition walls 4. The catalyst layer may contain a catalyst metal that functions as an oxidation and/or reduction catalyst, and a carrier that supports the catalyst metal.

The harmful components in the exhaust gas that is supplied to the exhaust gas purification catalyst are purified by coming into contact with the catalyst layer, as the exhaust gas flows through the inferior of the cells 2 of the substrate 1. For instance, HC and CO in the exhaust gas are oxidized by virtue of the catalytic function of the catalyst layer, to be converted (purified) into water ($H_2O$), carbon dioxide ($CO_2$) or the like. Also, $NO_x$ is reduced by virtue of the catalytic function of the catalyst layer, to be converted (purified) to nitrogen ($N_2$).

Various metal species capable of functioning as an oxidation, catalyst or reduction catalyst, can be used herein as the catalyst metal. Typical examples include for instance rhodium (Rh), palladium (Pd) and platinum (Pt), which are noble metals of the platinum group. Other metal species that can be used include for instance ruthenium (Ru), osmium (Os), iridium (Ir), silver (Ag) and gold (Au). An alloy of two or more of the foregoing metal species may be used herein. The metal species may also be some other metal species, for instance an alkali metal, an alkaline-earth metal, a transition metal or the like. Among the foregoing a combination of two or more metal species is preferably used as the catalyst metal. An example thereof is a combination of rhodium having high reducing activity and palladium and/or platinum having high oxidizing activity. Preferably, the catalyst metal is used in the form of microparticles having a sufficiently small particle size. The average particle size of the catalyst metal particles (average value of particle size worked out by IBM observation, likewise hereafter) is ordinarily about 1 to 15 nm, and may be 10 nm or smaller, 7 nm or smaller, and further 5 nm or smaller. Thereby the contact surface area with exhaust gas is increased and purification performance can be made yet better.

An inorganic compound conventionally utilized in this kind of exhaust gas purification catalysts can be appropriately used as the carrier that makes up the catalyst layer and that supports the above-described catalyst metal. Among the foregoing there is preferably used a porous carrier having a comparatively large specific surface area (herein, specific surface area measured by BET, likewise hereafter). Preferred examples include alumina ($Al_2O_3$), ceria ($CeO_2$), zirconia ($ZrO_2$), silica ($SiO_2$), titania ($TiO_2$) and solid solutions of the foregoing (for instance a ceria-zirconia complex oxide (CZ complex oxide)), as well as combinations of the foregoing. The carrier particles (for instance an alumina powder or a CZ complex oxide powder) may have a specific surface area of about 50 to 500 $m^2/g$, for instance 200 to 400 $m^2/g$ from the viewpoint of heat resistance and structural stability. The average particle size of the carrier particles may be typically of 1 to 500 nm, for instance of 10 to 200 nm.

Figure 2:
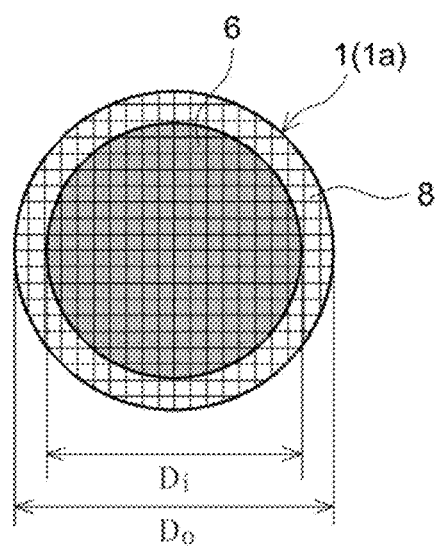
FIG. 2 is an end-portion cross-sectional diagram illustrating schematically a leading end section of the exhaust gas purification catalyst of FIG. 1.

The characterizing features of the exhaust gas purification catalyst 10 disclosed herein will be explained next in detail. FIG. 2 is an end-portion cross-sectional diagram illustrating schematically the leading end section (leading end face) 1a of the cylindrical exhaust gas purification catalyst 10 illustrated in FIG. 1. The leading end section 1a is a cross-section perpendicular to the direction of exhaust gas flow of the exhaust gas purification catalyst 10. The leading end section 1a is a portion positioned furthest upstream in the exhaust passage when the exhaust gas purification catalyst 10 is disposed in the exhaust passage. In the implementation of FIG. 2 the leading end section 1a i.e. the cross-section of the substrate 1 is substantially circular.

A catalyst layer is formed on the surface of the partition walls 4 at the leading end section 1a of the exhaust gas purification catalyst 10. A high density section 6 is formed in the catalyst layer of the leading end section 1a. The high density section 6 is disposed at a position not in contact with (is spaced apart from) the outer periphery of the leading end section 1a. The catalyst metal is supported at relatively high density in the high density section 6. The high density section 6 is a portion in which the exhaust gas flow rate is relatively high during warm-up of the internal combustion engine 12. Herein, the high density section 6 is formed as a circle slightly smaller than the circle of the leading end section 1a. In other words, there holds: diameter $D_o$ of the circle of the leading end section 1a>diameter $D_i$ of the circle of the high density section 6. The shape of the high density section 6 is not limited to being circular, and may be for instance a half moon shape, an elliptical shape, an oval shape, a polygonal shape or the like. For instance, the shapes of the leading end section 1a and of the high density section 6 may be identical or different.

A low density section 8 is formed in the catalyst layer in a portion located closer to the outer periphery than that of the high density section 6. The catalyst metal is supported in the low density section 8 at a lower density than in the high density section 6. The low density section 8 is a portion in which the exhaust gas flow rate is relatively low during warm-up of the internal combustion engine 12. The catalyst metal can be used effectively by reducing thus the catalyst metal density in a portion where the exhaust gas flow rate is low.

The low density section 8 is formed in the outer peripheral portion of the high density section 6. As described above, heat dissipates readily in a portion close to the outer periphery of the exhaust gas purification catalyst 10, and the temperature in that portion tends to be lower than that in the central portion. Accordingly, the effect of enhancing the warm-up property can be brought out yet better by providing the high density section 6 at an inner portion (center side of the leading end section 1a) that heats up relatively readily. The catalyst metal may be incorporated into the low density section 8 at a lower density than in the high density section 6, as in the present embodiment; alternatively, the low density section 8 need not contain any catalyst metal.

The amount (carrying amount) of the catalyst metal in the high density section 6 is not particularly limited, and may be of about 1 g or more, typically 2 g or more, for instance 5 g or more, per unit volume (1 liter) of the honeycomb substrate 1. The ratio of the catalyst metal density (average density) between the high density section 6 and the low density section 8 may be set to be substantially comparable to, or higher than, the corresponding ratio of gas amount during warm-up of the internal combustion engine 12. As an example, the catalyst metal density (average density) of the high density section 6 may be about 1.5 times or more, typically 1.7 times or more, preferably 2 times or more, for instance 3 times or more, and particularly 3.3 times or more, that of the low density section 8. Within the above ranges the exhaust gas purification performance can be better enhanced in particular during warm-up of the internal combustion engine 12.

The amount of the catalyst metal in the high density section 6 is preferably not too large, in terms of reducing the use amount of the catalyst metal and cutting costs. As an example, the amount of catalyst metal per unit volume (1 liter) of the honeycomb substrate 1 is 50 g or less, typically 30 g or less, and for instance 10 g or less. The catalyst metal density (average density) of the high density section 6 may be about 10 times or less, typically 8 times or less, preferably 7 times or less, and for instance 6.7 times or less, that of the low density section 8. Within the above ranges it becomes possible to suppress growth (sintering) and alloying of the catalyst metal particles, and to stably achieve a desired catalytic activity.

At the leading end section 1a, the catalyst metal density of the high density section 6 may be substantially homogeneous, or may be exhibit gradation such that the catalyst metal varies gradually for instance in accordance with the exhaust gas flow rate. Alternatively, the catalyst metal density may be set to vary stepwise. For instance, the high density section 6 may be formed to a stepwise-varying catalyst metal density, such that the density of the catalyst metal increases with increasing proximity to the center of the high density section 6.

In the technology disclosed herein, the size and arrangement of the high density section 6 are determined on the basis of the distribution of the exhaust gas flow rate during warm-up of the internal combustion engine 12. Accordingly, the size of the high density section 6 is not particularly limited, but the surface area proportion of the high density section 6 is about 9% or higher, typically 25% or higher, for instance 36% or higher and preferably 49% or higher, with respect to 100% as the total surface area of a cross-section of the exhaust gas purification catalyst 10 perpendicular to the direction of exhaust gas flow, from the viewpoint of eliciting the effect of the present invention to a yet higher level (effect of enhancing the warm-up property).

In the implementation of FIG. 2, in which the high density section 6 is formed in the inner portion of the leading end section 1a, the diameter $D_i$ of the high density section 6 is 30% or more, typically 50% or more, for instance 60% or more, and preferably 70% or more, of $D_o$, where $D_o$ denotes the outer diameter of the leading end section, 1a (diameter of the circumscribed circle) of the substrate 1. Within the above ranges, the exhaust gas purification function works better, and in particular it becomes possible to suppress, to a high degree, emissions of harmful components during warm-up of the internal combustion engine 12.

On the other hand, the surface area of the high density section 6 is preferably not too large, in terms of reducing the use amount of the catalyst metal and cutting costs. As an example, the surface area proportion of the high density section 6 in the leading end section 1a may be about 90% or lower, typically 81% or lower, preferably 64% or lower, and for instance 56% or lower. In the implementation of FIG. 2, the diameter $D_i$ of the high density section 6 is 95% or less, typically 90% or less, preferably 80% or less and for instance 75% or less, of $D_o$, where $D_o$ denotes the outer diameter of the leading end section 1a (diameter of the circumscribed circle) of the substrate 1. By prescribing the above ranges, the effect of the present invention (effect of enhancing the warm-up property) can be elicited with a little amount of catalyst metal.

The arrangement position of the high density section 6 at the leading end section 1a is mainly determined by the positional relationship of the internal combustion engine 12 and the exhaust gas purification catalyst 10. In a case where, for instance, the internal combustion engine 12 and the exhaust gas purification catalyst 10 are disposed in a substantially linear fashion, and communicate with each other by way of a straight exhaust passage, then the high density section 6 may be provided concentrically the leading end section 1a in such a manner that the center of the circle of the leading end section 1a and the center of the circle of the high density section 6 substantially overlap each other, as illustrated in FIG. 2.

In a case where, as another example, the internal combustion engine 12 and the exhaust gas purification catalyst 10 communicate with each other via an exhaust passage having for instance an L-shaped or S-shaped "bend" (having a bent portion), or having an inclined portion, then the center of the circle of the high density section 6 may be set to be eccentric with respect to the center of the circle of the leading end section 1a. For instance, the center of the circle of the high density section 6 may be positioned at a distance of 5% or more, of for instance of about 10 to 30% in a straight line from the center of the circle of the leading end section 1a, with 100% as the outer diameter $D_o$ of the substrate 1.

Figure 6:
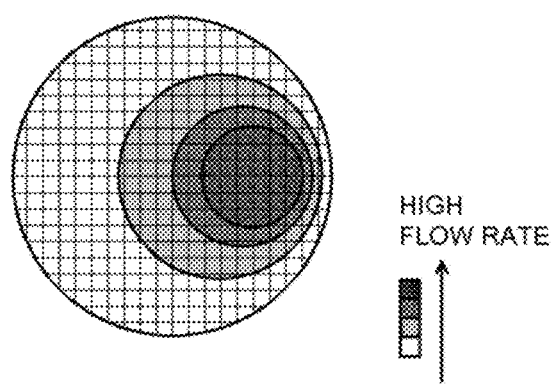
FIG. 6 is a diagram illustrating schematically an exhaust gas flow rate upon engine start-up according to an embodiment.

FIG. 6 illustrates results of a measurement, by the inventors, of exhaust gas flow rate during engine start-up, for an exhaust gas purification catalyst 10A of cylindrical shape disposed in a vehicle provided with an exhaust pipe having a bend. The darker the portion in the figure, the higher is the corresponding exhaust gas flow rate during engine start-up. FIG. 6 reveals that the exhaust gas flow rate is higher at a position offset from the center of the leading end section in a case where the exhaust gas purification catalyst 10A is disposed in a bent exhaust passage. An arrangement of the high density section 6 such as the one illustrated in FIG. 7 and FIG. 8 can be adopted in the case of a distribution of exhaust gas flow rate that is thus offset from the center.

Figure 7:
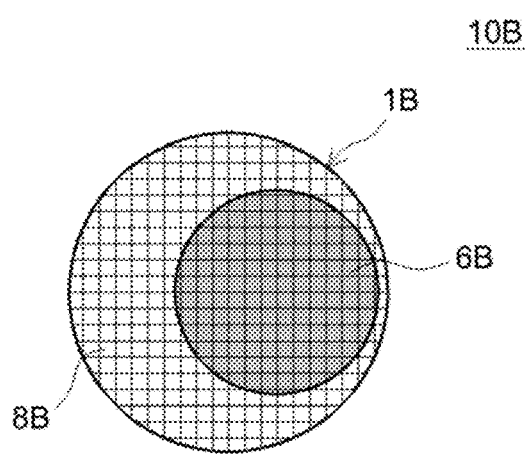
FIG. 7 is an end-portion cross-sectional diagram illustrating schematically a leading end section of an exhaust gas purification catalyst according to another embodiment.

For instance in an exhaust gas purification catalyst 10B illustrated in FIG. 7, a circular high density section 6B is formed in a portion of high exhaust gas flow rate, rightward from the center, at the leading end section of a cylindrical substrate 1B. In this example, the center of the circle of the high density section 6 is positioned at a distance of about 20% from the center of the circle of the leading end section 1a. A low density section 8B is formed in a portion of relatively low exhaust gas flow rate.

Figure 8:
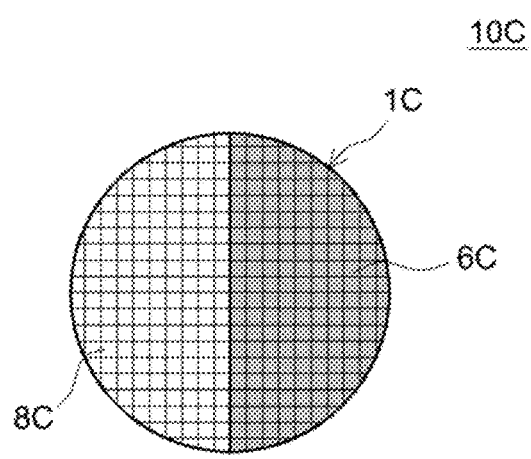
FIG. 8 is an end-portion cross-sectional diagram illustrating schematically a leading end section of an exhaust gas purification catalyst according to another embodiment.

In an exhaust gas purification catalyst 10C illustrated in FIG. 8, for instance, a high density section 6C of half-moon shape is formed in the right half of high exhaust gas flow rate, at the leading end section, of a cylindrical substrate 1C. A low density section 8C of half-moon shape is formed in the left half of relatively low exhaust gas flow rate.

Figure 3:
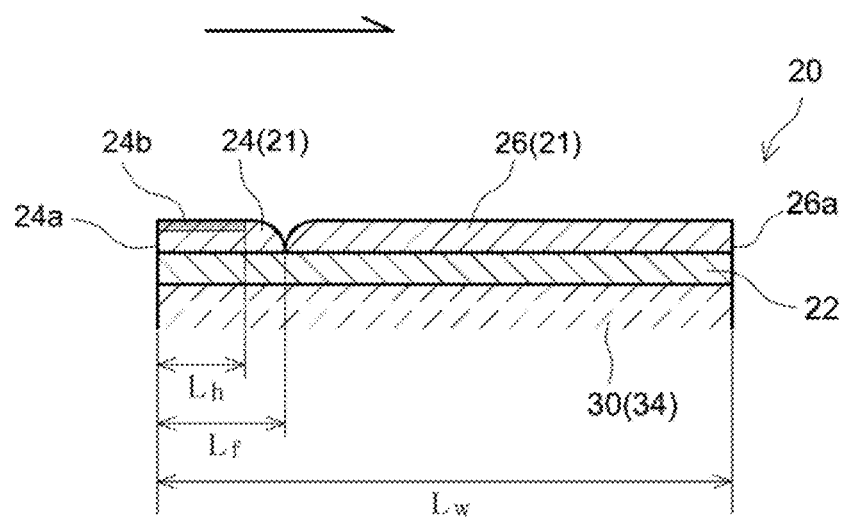
FIG. 3 is a cross-sectional diagram illustrating schematically the configuration of a rib wall portion of an exhaust gas purification catalyst according to an embodiment.

The features of the direction of exhaust gas flow will be explained next with reference to FIG. 3. FIG. 3 is a cross-sectional diagram illustrating the configuration of the surface portion of a substrate 30 of an exhaust gas purification catalyst 100. The direction of exhaust gas flow is indicated with an arrow in the figure. The left side of FIG. 3 corresponds to the upstream side of the exhaust passage (exhaust pipe 14), and the right side corresponds to the downstream side of the exhaust passage.

In the implementation of FIG. 3, a catalyst layer 20 having a two-layer structure is formed on the surface of a rib wall 34 of the substrate 30. The catalyst layer 20 is provided with a lower layer 22 formed on the surface of the substrate 30, and with an upper layer 21 formed on the lower layer 22. The lower layer 22 is formed to a length identical to the total length Lw of the substrate 30 in the direction of exhaust gas flow, so as to cover the surface of the substrate 30.

The upper layer 21 makes up a surface layer portion (uppermost layer) of the catalyst layer 20. The upper layer 21 is divided into a front section 24 disposed upstream in the direction of exhaust gas flow, and a rear section 26 disposed downstream in the direction of exhaust gas flow. The front section 24 encompasses a leading end section 24a positioned upstream in the direction of exhaust gas flow. The front section 24 and the rear section 26 are formed to be shorter than the total length of the substrate 30 in the direction of exhaust gas flow. The sum of the length Lf of the front section 24 and the length of the rear section 26 is substantially identical to the total length Lw of the substrate 30, in the direction of exhaust gas flow.

As in conventional three-way catalysts, in the catalyst layer 20 having such a layered structure, it is possible to prescribe for instance mutually different types of carrier, as well as mutually different types and content ratios of catalyst metal supported on the carrier, for the front section 24 and the rear section 26 that make up the upper layer 21, and for the lower layer 22. For instance, the arrangement of the catalyst metal can be adjusted as appropriate in the light for instance of the configurations of conventional exhaust gas purification catalysts. In a preferred example, for instance the lower layer 22 contains Pd and/or Pt and the upper layer 21 (for instance the rear section 26) contains Rh.

In FIG. 3 a high density section 24b is formed in a portion of the front section 24 that makes up the upper layer 21. That is, the carrier in the front section 24 constitutes the carrier of the catalyst metal that is supported, at high density, in the high density section 24b. The portion of the front section 24 other than the high density section 24b need not contain any catalyst metal, but preferably contains a catalyst metal, in a case where, for instance, the high density section 24b contains Pd, the portion of the front section 24 other than the high density section 24b preferably contains one or more from among of Pd, Rh and Pt. The foregoing metals may be alloyed, in a case where, for instance, the high density section 24b contains Rh, the portion of the front section 24 other than the high density section 24b preferably contains Pd or Rh, or an alloy of these metals. In a case where, for instance, the high density section 24b contains a catalyst metal other than Pd, Rh or Pt, the portion of the front section 24 other than the high density section 24b preferably contains a similar metal, or an alloy of that metal.

Ordinarily, the average thickness of the front section 24 (length in the layering direction of the catalyst layer 20) is suitably of about 10 to 200 μm, and is preferably about 30 to 100 μm. The average thickness of the front section 24 may be identical to, or may differ from, the thickness of the rear section 26.

The length Lf of the front section 24 in the direction of exhaust gas flow is not particularly limited, and may be ordinarily 1 to 500 mm, for instance about 5 to 150 mm. The length Lf of the front section 24 from the leading end section 24a may be about 10% or more, typically 20% or more, and for instance 24% or more, with 100% as the total length Lw of the substrate 30 (exhaust gas purification catalyst 100). The length Lf of the front section 24 may be ordinarily less than 100% of the total length Lw of the substrate 30, typically 60% or less and for instance 50% or less.

The high density section 24b is formed inside the front section 24. In other words, the catalyst metal of the high density section 24b is supported on the carrier of the front section 24. Accordingly, substantially the same average thickness (for instance, within a range of about ±5%) is maintained between the portion of the high density section 24b in the front section 24 and the portion in which the high density section 24b is not formed. It becomes therefore possible for instance to keep pressure loss small compared with an instance where the high density section 24b is formed on the surface of the front section 24. The high density section 24b is formed on the outermost surface of the front section 24, and is disposed so as to allow for better contact with the exhaust gas.

The length Lh of the high density section 24b in the direction of exhaust gas flow can vary depending for instance on the type and size of the substrate 30, and hence is not particularly limited. As an example, the length Lh of the high density section 24b, from the leading end section 24a, may be 10% or more, typically 20% or more, and for instance 24% or more, with 100% as the total length Lw of the substrate 30 (exhaust gas purification catalyst 100). As a result the high density section can be formed with better precision, and yet more stable quality can be secured. In turn, this allows improving yield and increasing productivity. Further, the catalyst performance on the upstream side of the exhaust gas purification catalyst 100 can be increased, and the catalyst metal utilized effectively. The warm-up property as well can be enhanced. The length Lh of the high density section 24b is typically shorter than that of the front section 24, and may be about 90% or less, preferably 50% or less, and for instance 43% or less of the total length Lw of the substrate 30. As a result this allows preventing migration of the catalyst metal from the high density section 24b, and suppressing drops in catalytic activity caused by sintering or alloying.

In a preferred embodiment, the length Lh of the high density section 24b is 10 to 95%, typically 50 to 90% and for instance 70 to 80% of the total length Lf of the front section 24. A further pronounced effect can be achieved by prescribing the high density section 24b to lie within the above range. For instance, it becomes possible to prevent increases in heat capacity in a portion other than the high density section 24b, and to enhance the warm-up property. In particular, it is preferable to adopt the above range in a case where the portion of the front section 24 other than the high density section 24b contains no catalyst metal. Complete covering of the entirety of the front section by the high density section 24b is prevented herein by prescribing the length Lh of the high density section 24b to be equal to or smaller than the above predetermined value. As a result, migration of the catalyst metal to other portions (for instance, the rear section 26) is unlikely to occur, and catalytic activity can be maintained stably.

In a preferred embodiment, the content of catalyst metal is higher at a region in the vicinity of the leading end section 24a, in the direction of exhaust gas flow. For instance, a range from the leading end section 24a up to 50% of the total length Lw of the substrate is defined as an upstream region, and downstream thereof (i.e. range from the rear end section (trailing end) 26a up to 50% of the total length Lw of the substrate) is defined as a downstream region. The total amount of catalyst metal contained in the upstream region may be sufficiently larger than that in the downstream region. For instance, about 70% or more, preferably 80% or more and for instance 90% or more of the total amount of catalyst, metal contained in the exhaust gas purification catalyst 100 may be disposed in the upstream region. The warm-up property of the catalyst can be enhanced by increasing the amount of catalyst metal in the upstream region.

The downstream region need not contain any catalyst metal, but preferably does contain a catalyst metal. For instance, about 5% or more, preferably 10% or more and for instance 20% or more of the total amount of catalyst metal contained in the exhaust gas purification catalyst 100 may be disposed in the downstream region, incorporating also a catalyst metal in the downstream region, allows better reducing emissions during a high-load operation (for instance, during high-speed driving of an automobile) where the exhaust gas flow rate is high.

In the implementation of FIG. 3 the upper layer 21 provided with the front section 24 and the rear section 26 is formed on the surface of the lower layer 22. Accordingly, the catalyst layer 20 has a vertical two-layer structure over the total length of the substrate 30, in the direction of exhaust gas flow, but the catalyst layer 20 is not limited thereto. For instance, the upper layer 21 and the lower layer 22 may be layered partially. Alternatively, there may be formed the front section 24 alone on the lower layer 22, or the lower layer 22 may be omitted.

The high density section 24b is formed inside the front section 24, but is not limited thereto. For instance, the high density section 24b may be formed on the surface of the front section 24. Alternatively, the high density section 24b may be formed in a portion of the lower layer 22 including the leading end section 24a. Further, the high density section 24b may be formed over the front section 24 and the rear section 26. As a concrete example, the front section 24 is formed to a length of 30% of the total length of the exhaust gas purification catalyst 100 from the leading end section 24a and the rear section 26 is formed to a length of 90% of the total length of the exhaust gas purification catalyst 100 from the rear end section 26a. When forming in this case the high density section 24b at a proportion of 21% of the total length Lw of the exhaust gas purification catalyst 100, then 10% of the high density section 24b is formed in the front section 24, and the remaining 11% is formed in the rear section 26.

The method for producing the exhaust gas purification catalyst disclosed herein is not particularly limited, and the exhaust gas purification catalyst can be produced in accordance with a method that includes the following steps:
(1) preparing a substrate for forming an exhaust gas purification catalyst;
(2) arranging the substrate in an exhaust passage connected to an internal combustion engine, and checking the distribution of the exhaust gas flow rate during a fast idle operation (during warm-up) from the start-up of the internal combustion engine until warm-up is complete; and
(3) forming a catalyst layer on the substrate, on the basis of the obtained distribution of exhaust gas flow rate, in such a manner that a noble metal is supported at high density in a portion where the exhaust gas flow rate is relatively high.

The substrate and noble metals described above can be used as the substrate and noble metal (catalyst metal) herein. Checking of the distribution of the exhaust gas flow rate and supporting of the noble metal can be accomplished in accordance with conventional methods.

In the production of for instance the exhaust gas purification catalyst 100 provided with a catalyst layer 20 such as the one illustrated in FIG. 3, the above step (3) includes:
(3-1) applying a composition for forming the lower layer 22 onto the surface of the substrate; (3-2) applying a composition for forming the front section 24, onto the surface of the lower layer 22, from the side of the leading end section 24a; (3-3) applying a composition for forming the rear section 26, onto the surface of the lower layer 22, from the side of the rear end section 26a; (3-4) setting a formation range of the high density section 26b in the leading end section 24a; (3-5) applying a composition for the high density section 26b, within the above set range, from the leading end section 24a side; and (3-6) forming the catalyst layer 20 through a thermal treatment.

As a concrete example, firstly there is prepared a slurry for lower layer formation, containing a desired catalyst metal component and a desired carrier powder. The slurry is applied onto the surface of the honeycomb substrate 30 by resorting to a conventionally known method such as wash coating (step 3-1).

Next there is formed a slurry for front section formation containing a desired catalyst metal component (for instance, a metal component of the same kind as that of the catalyst metal of the lower layer 22) and a desired carrier powder. The slurry is overlaid on the surface of the lower layer 22 in accordance with a method such as wash coating or the like, from the side of the leading end section 24a (step 3-2).

Next there is prepared a slurry for rear section formation containing a desired catalyst metal component (for instance, a metal component different from the catalyst metal of the lower layer 22) and a desired earner powder. This slurry is overlaid on the surface of the lower layer 22 in accordance with a method such as wash coating or the like, from the side of the rear end section 26a (step 3-3).

In addition to the catalyst metals and carrier, arbitrary additive components such as conventionally known oxygen absorbing and releasing materials, binders and other additives can be incorporated, as appropriate, into the slurries for forming the above layers. For instance a CZ complex oxide can be used as an oxygen absorbing and releasing material. For instance alumina sol, silica sol or the like can be used as the binder.

Next, the formation range of the high density section 26b is set on the basis of the distribution of the exhaust gas flow rate in (2). Specifically, the formation range of the high density section 24b is set for the portion in which the exhaust gas flow rate is high during a fast idle operation. The formation range of the high density section 24b is set for instance on the basis of the surface area proportion occupied by the high density section 24b in the leading end section 24a, and the length Lh of the high density section 24b in the direction of exhaust gas flow (step 3-4). Preferably, there is further established a density ratio between the high density section 26b and other portions, on the basis of the distribution of the exhaust gas flow rate.

Next there is prepared a slurry containing a desired concentration of the desired catalyst metal component (for instance, a metal component of the same kind as that of the catalyst metal of the front section 24). The slurry is applied (supplied) to the above set range including the leading end section 24a, in accordance with a conventionally known impregnation method. As a result, the catalyst metal becomes supported on the carrier at a locally high density, in the high density section 24b (step 3-5).

Lastly, the obtained composite body is subjected to a thermal treatment at a predetermined temperature tor a predetermined time (step 3-6). The thermal treatment conditions can vary depending on the shape and size of the substrate or the carrier, and are therefore not particularly limited. As an example, the catalyst layer 20 can be formed through drying at about 80 to 300° C. for 1 to 10 hours, followed by warming, and then firing at about 400 to 1000° C. for about 2 to 4 hours.

As a result of the above there can be obtained for instance an exhaust gas purification catalyst 100 that is provided with a catalyst layer 20 having the layered structure type illustrated in FIG. 3.

Several examples pertaining to the present invention will be explained next, but the invention is not meant to be limited to the concrete examples illustrated below.

Test Example I

Example 1

The exhaust gas purification catalyst according to the present test example is provided with a cylindrical honeycomb substrate and with a catalyst layer provided on the substrate. The catalyst layer has a vertical two-layer structure as viewed from the substrate. The lower layer is formed to a length identical to the total length of the substrate, in the direction of exhaust gas flow. An upper layer that makes up the uppermost layer portion of the catalyst layer is formed out of a front section that is formed in a portion corresponding to 30% of the total length of the substrate, from the leading end section in the direction of exhaust gas flow, and a rear section that is formed in a portion corresponding to 70% of the total length of the substrate, from the rear end section in the direction of exhaust gas flow. In the catalyst layer of this exhaust gas purification catalyst there is formed a high density section of substantially cylindrical shape, over a predetermined length from the leading end section (end face on the upstream side) in the direction of exhaust gas flow. This high density section satisfies the following conditions.

The high density section is formed as a circle having a diameter $D_i$ being 70% of the outer diameter $D_o$ of the honeycomb substrate, at the leading end section in the direction of exhaust gas flow (cross-section perpendicular to the direction of exhaust gas flow).

The high density section is formed in a portion (inside the front section) of 20% (20 mm) of the overall length of the substrate, from the leading end section, in the direction, of exhaust, gas flow (cylinder axis direction).

An exhaust gas purification catalyst having such a configuration was produced as follows.

Firstly there was prepared a cylindrical honeycomb substrate (made of cordierite) having a volume (denoting herein the entire bulk volume including also the volume of cell passages) of about 0.9 L and having a length of 100 mm.

Next, an alumina powder, a $CeO_2$—$ZrO_2$ complex oxide powder and an aqueous solution of palladium nitrate were mixed, with drying at 250° C. for 8 hours, followed by firing at 500° C. for 4 hours. As a result there was obtained a Pd-carrying mixed powder in which the alumina powder and the CZ complex oxide powder, with Pd supported thereon, were mixed at a mass ratio of $Al_2O_3$:CZ=3:1. The Pd-carrying mixed powder and an alumina binder were mixed at a mass ratio of 97:3, with addition of a suitable amount of pure water to prepare a slurry for lower layer formation. The entirety of the substrate, from the leading end section of the substrate (100% of the overall length of the substrate) was wash-coated with this slurry, with drying at 150° C. for 1 hour.

Next an alumina powder and an aqueous solution of palladium nitrate were mixed, with drying at 120° C., and firing at 500° C. for 1 hour, to yield as a result a Pd-carrying powder having a Pd carrying ratio of about 1 mass %. This Pd-carrying powder and a CZ complex oxide powder as a non-carrier were mixed at a mass ratio of 2:1, with addition of a suitable amount of pure water to prepare a slurry for front section formation. A portion of the substrate corresponding to 30% of the overall length of the substrate, from the leading end section of the substrate, was wash-coated with this slurry, with drying at 150° C. for about 1 hour.

Next a $CeO_2$—$ZrO_2$ complex oxide powder and an aqueous solution of rhodium nitrate were mixed and dried at 120° C., with firing at 600° C. for 2 hours, to yield a Rh-carrying powder having a Rh carrying ratio of about 0.25 mass %. This Rh-carrying powder and an alumina powder as a non-carrier were mixed at a mass ratio of 1:1, with addition of a suitable amount of pure water to prepare a slurry for rear section formation. A portion of the substrate corresponding to 70% of the overall length of the substrate, from the rear end section of the substrate, was wash-coated with this slurry, with drying at 150° C. for about 1 hour.

Next, a 5 g/L aqueous solution of palladium nitrate was applied (supplied) over a range of 70% of the outer diameter $D_o$ of the substrate, to a length of 20 mm from the leading end section, to impregnate that portion with Pd. This was followed by drying at 150° C. for 1 hour, to cause Pd to be supported, at high density, on the entire surface of the catalyst layer (front section).

The resulting composite body was fired thereafter at 500° C. for 1 hour, to yield an exhaust gas purification catalyst (Example 1) in which the substrate had formed thereon a catalyst layer having a configuration such as the one described above.

The configuration of the catalyst layer of Example 1 is summarized below.

Upper layer (front section): alumina (Pd-supporting), CZ complex oxide

In the front section the high density section contains Pd at a higher density than at other portions.

(rear section): CZ complex oxide (Rh-supporting), alumina

Lower layer: alumina (Pd-supporting), CZ complex oxide (Pd-supporting)

Comparative Example

The exhaust gas purification catalyst of the present example is identical to that of Example 1, except that herein a circular high density section of size identical to the outer diameter $D_o$ of the honeycomb substrate was formed in the leading end section, in the direction of exhaust gas flow. Specifically, an exhaust gas purification catalyst (comparative example) was produced in the same way as in Example 1, but herein the 5 g/L aqueous solution of palladium nitrate was applied within a range of 100% of the outer diameter $D_o$ of the substrate, over a length of 20 mm from the leading end section. The total amount of catalyst metal contained in the exhaust gas purification catalyst of the comparative example is about twice that in Example 1.

The features of the exhaust gas purification catalysts are summarized in Table 1 below. The reference symbols in Table 1 correspond to FIG. 3. The portion notated as "low density section" in Table 1 denotes the portion in the front section at which the high density section 24b is not formed. The "high density section/low density section" denotes the ratio of catalyst metal density in a portion where the exhaust gas flow rate is relatively low (low density section) and in a portion of relatively high exhaust gas flow rate (high density section) during warm-up of the Internal combustion engine.

TABLE 1

|  | Front section 24 | | | | Rear section 26 Metal species (density) | Lower layer section 22 Metal species (density) | High density section/low density section (24b/other than 24b) |
|---|---|---|---|---|---|---|---|
|  | High density section 24b | | | Other than 24b Metal species (density) | | | |
|  | Leading end section | | Length from leading end section Lh (%) | | | | |
|  | Diameter $D_i$ | Surface area | Metal species (density) | | | | |
| Comparative example | 100% | 100% | 20 mm (20%) | Pd (5 g/L) | Pd (1.5 g/L) | Rh (0.2 g/L) | Pd (0.5 g/L) | 3.33 |
| Example 1 | 70% | 49% | | | | | |

* The reference symbols corresponding to FIG. 3.
* The noble metal amount in Example 1 is about half that of the comparative example.

(Evaluation of the Warm-up Property)

The warm-up property of the obtained exhaust gas purification catalysts (Comparative example. Example 1) was evaluated. Specifically, there was compared the inlet gas temperature at the point in time where the purification rate of the respective harmful components reached 50%, during fast idle from engine start-up. The inlet gas temperature was measured at a pipe center position, 100 mm from the leading end face of the exhaust gas purification catalyst. The results are illustrated in FIG. 4.

Figure 4:
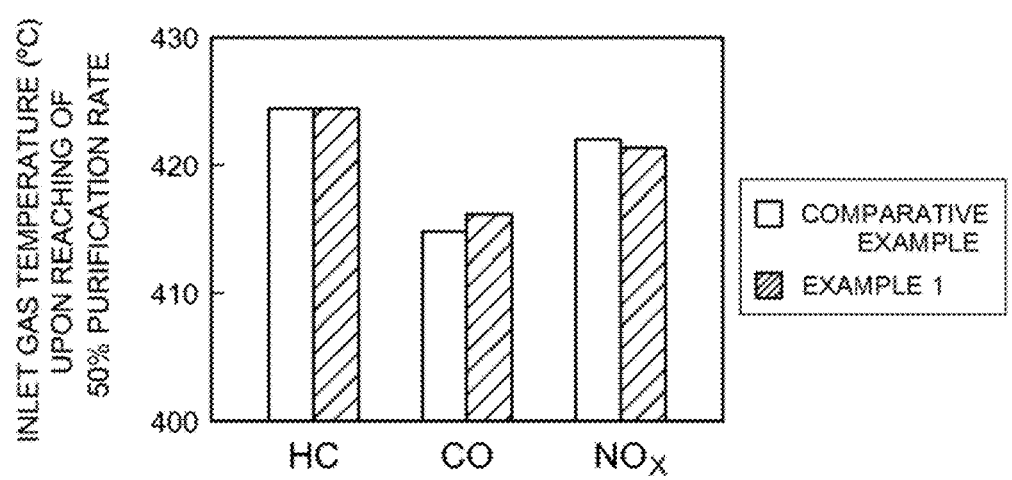
FIG. 4 is a graph comparing the warm-up property of exhaust gas purification catalysts in a comparative example and in Example 1.

In Example 1 the warm-up property was similar to that of the comparative example, as illustrated in FIG. 4, despite the fact that the use amount of the catalyst metal was about half that of the comparative example, in the exhaust gas purification catalyst of Example 1 it was thus possible to reduce (to halve) the use amount of catalyst metal while preserving an excellent warm-up property.

Test Example II

Example 2

In the exhaust gas purification catalyst of the present example the use amount of catalyst metal in the high density section was set to twice that of Example 1 in L above. Specifically, an exhaust gas purification catalyst (Example 2) was produced in the same way as in Example 1 but herein a 10 g/L aqueous solution of palladium nitrate was applied over a range of 20 mm from the leading end section and 70% of the inner diameter $D_i$, of a circle concentric with the center of the substrate. The total amount of the catalyst metal contained in the exhaust gas purification catalyst of Example 2 is substantially identical to that of the comparative example. The features of the exhaust gas purification catalysts are summarized in Table 2 below. The reference symbols and technical terms in Table 2 are identical to those of Table 1.

Figure 5:
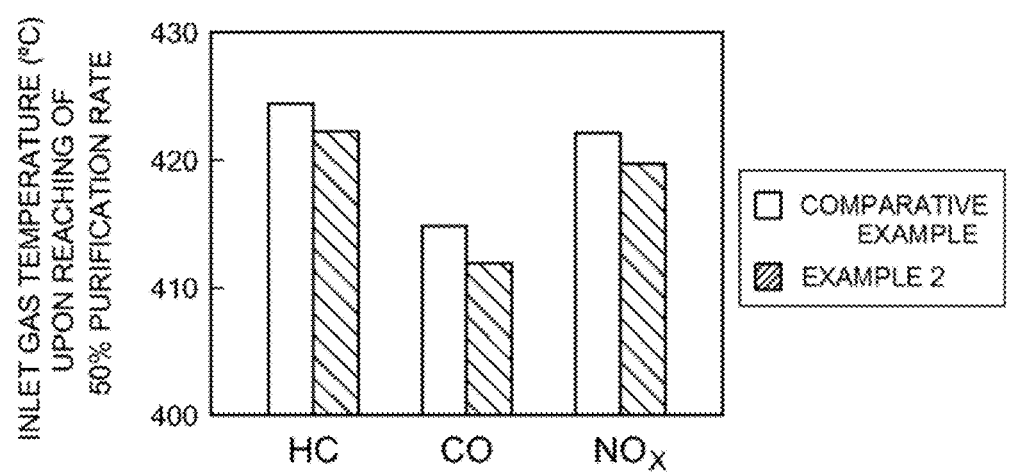
FIG. 5 is a graph comparing the warm-up property of exhaust gas purification catalysts in a comparative example and in Example 2.

The warm-up property of the obtained exhaust gas purification catalyst (Example 2) was evaluated in the same way as above. The results are illustrated in FIG. 5. As FIG. 5 reveals, the inlet gas temperature in Example 2 was lower than that in the comparative example, despite the feet that the use amount of catalyst metal was identical to that of the comparative example. In the exhaust gas purification catalyst of Example 2, thus, the warm-up property could be enhanced while maintaining the use amount of catalyst metal, by concentrating the catalyst metal to cause the latter to be supported at high density in the portion of high exhaust gas flow rate.

Test Example III

Examples 5 to 8

In the exhaust gas purification catalysts of the present example there was used a cylindrical honeycomb substrate (made of cordierite) having a volume of about 0.6 L and a length of 60 mm, but setting herein different lengths of the high density section in the direction of exhaust gas flow. Specifically, exhaust gas purification catalysts (Examples 3 to 6) were produced in the same way as in Example 1, but herein a 5 g/L aqueous solution of palladium nitrate was applied from the leading end section over a range of 24.3 to 42.3% of the overall length of the substrate, in the direction of exhaust gas flow. The features of the exhaust gas purification catalysts of the respective examples are summarized in Table 3 below. The reference symbols and technical terms in Table 3 are identical to those of Table 1.

TABLE 2

| | Front section 24 | | | | Rear | Lower layer | |
| --- | --- | --- | --- | --- | --- | --- | --- |
| | High density section 24b | | | Other | | | |
| | Leading end section | | | than 24b | section 26 | section 22 | High density |
| | | Length from | | Metal | Metal | Metal | section/ |
| | Diameter | Surface | section Lh | species | species | species | species | low density section |
| | $D_i$ | area | (%) | (density) | (density) | (density) | (density) | (24b/other than 24b) |
| Comparative example | 100% | 100% | 20 mm (20%) | Pd (5 g/L) | Pd (1.5 g/L) | Rh (0.2 g/L) | Pd (0.5 g/L) | 1.00 |
| Example 2 | 70% | 49% | | Pd (10 g/L) | | | | 6.66 |

\* The reference symbols corresponding to FIG. 3.
\* The noble metal amount in Example 2 is similar to that of the comparative example.

TABLE 3

| | Front section 24 | | | | | | |
| --- | --- | --- | --- | --- | --- | --- | --- |
| | High density section 24b | | | Other than 24b | Rear section 26 | Lower layer section 22 | High density section/low density section | 50% purification |
| | Leading end section diameter Di | Length from leading end section Lh (%) | Metal species (density) | Metal species (density) | Metal species (density) | Metal species (density) | (24b/other than 24b) | rate of HC component (° C.) |
| Example 3 | 70% | 24.3% | Pd (5 g/L) | Pd (1.5 g/L) | Rh (0.2 g/L) | Pd (0.5 g/L) | 3.33 | 413.2 |
| Example 4 | | 31.0% | | | | | | 420.8 |
| Example 5 | | 36.0% | | | | | | 421.8 |
| Example 6 | | 42.3% | | | | | | 422.8 |

(* The reference symbols corresponding to FIG. 3.)

The warm-up property of the obtained exhaust gas purification catalysts (Examples 3 to 6) was evaluated in the same way as above. As a typical example. Table 3 illustrates the inlet gas temperature at a time where the 50% purification rate of the HC component is reached. Table 3 reveals that the inlet gas temperature dropped, and the warm-up property was excellent, when the length of the high density section was 50% or less, 40% or less, 30% or less, and in particular 25% or less.

Specific examples of the present invention have been explained in detail above, but these are merely illustrative in nature and do not limit the claims of the present invention in any way. The features set forth in the claims encompass various modifications and changes to the specific examples illustrated above.

REFERENCE SIGNS LIST 1, 1B, 1C, 30 Substrate
1a, 24a Leading end section (starting end)
2 Cell (through-hole)
4, 34 Partition wall (rib wall)
6, 6B, 6C, 24b High density section
8, 8B, 8C Low density section
10, 10A, 10B, 10C, 100 Exhaust gas purification catalyst
20 Catalyst layer
21 Upper layer
22 Lower layer
24 Front section
26 Rear section
26a Rear end section (trailing end)

The invention claimed is:

1. An exhaust gas purification catalyst that is disposed in an exhaust passage connected to an internal combustion engine, and that purifies exhaust gas emitted by the internal combustion engine, the catalyst comprising:
a substrate; and
a catalyst layer formed on the substrate, wherein
the catalyst layer comprises a lower layer formed on the surface of the substrate and an uppermost layer formed on the lower layer, both the lower layer and the uppermost layer comprising a noble metal functioning as an oxidation and/or reduction catalyst, and a carrier that supports the noble metal, and said uppermost layer is divided into a front section disposed upstream in the direction of exhaust gas flow, and a rear section disposed downstream in the direction of exhaust gas flow,
wherein a leading end section of the exhaust passage that is positioned upstream in a direction of exhaust gas flow has a portion in which the flow rate of exhaust gas is high during warm-up of the internal combustion engine and a portion in which the flow rate of exhaust gas is low during warm-up of the internal combustion engine,
wherein the front section of the uppermost layer in the portion of high flow rate of exhaust gas has a high density section with a higher noble metal density than the noble metal density of the front section of the uppermost layer in the portion of low flow rate of exhaust gas, the portion of low flow rate of exhaust gas being located closer to the outer periphery of the cross-section of the exhaust passage than the high density section,
the high density section of the front section of the uppermost layer being shorter than the total length of the exhaust gas purification catalyst from the leading end section, in the direction of exhaust gas flow, and
wherein the front section of the uppermost layer comprises palladium.

2. The exhaust gas purification catalyst of claim 1, wherein the density of the noble metal in the high density section of the front section of the uppermost layer is 1.5 times or more the density of the noble metal in the front section of the uppermost layer in the portion of low flow rate of exhaust gas.

3. The exhaust gas purification catalyst of claim 1, wherein in the direction of exhaust gas flow, the high density section of the front section of the uppermost layer is formed to a length of 10% to 50% from the leading end section, with respect to 100% as the total length of the exhaust gas purification catalyst.

4. The exhaust gas purification catalyst of claim 1, wherein the high density section is formed over a surface area of 9% to 64% with respect to 100% as the total surface area of a cross-section, of the exhaust gas purification catalyst, perpendicular to the direction of exhaust gas flow.

5. The exhaust gas purification catalyst of claim 4, wherein the high density section is formed at a position spaced from an outer periphery of the cross-section of the exhaust gas purification catalyst, so as not to be in contact with the outer periphery.

6. The exhaust gas purification catalyst of claim 1, wherein a cross-section, of the exhaust gas purification catalyst, perpendicular to the direction of exhaust gas flow is formed as a circle, and the cross-section of the high density section is formed as a circle the diameter of which is smaller than that of the circle of the exhaust gas purification catalyst.

7. The exhaust gas purification catalyst of claim 6, wherein the exhaust passage is straight from the portion in which the exhaust passage is connected to the internal combustion engine up to the portion in which the exhaust gas purification catalyst is disposed, and the circle of the high density section is disposed concentrically with the circle of the exhaust gas purification catalyst.

8. The exhaust gas purification catalyst of claim 6, wherein the exhaust passage has a bent portion and/or an inclined portion between the portion in which the exhaust passage is connected to the internal combustion engine and the portion in which the exhaust gas purification catalyst is disposed, and the center of the circle of the high density section is eccentric with respect to the center of the circle of the exhaust gas purification catalyst.

9. The exhaust gas purification catalyst of claim 1, wherein the high density section of the front section of the uppermost layer has a higher palladium density than the front section of the uppermost layer in the portion of low flow rate of exhaust gas.

10. The exhaust gas purification catalyst of claim 9, wherein the noble metal consists of palladium.

11. The exhaust gas purification catalyst of claim 1, wherein the noble metal consists of palladium.

12. The exhaust gas purification catalyst of claim 1, wherein the noble metal comprises one or more metal species, the metal species being chosen from a group consisting of rhodium, palladium, ruthenium, osmium, iridium, silver, and gold.

13. The exhaust gas purification catalyst of claim 1, wherein the rear section of the uppermost layer comprises rhodium as the noble metal.

* * * * *